Figures 2, 3:
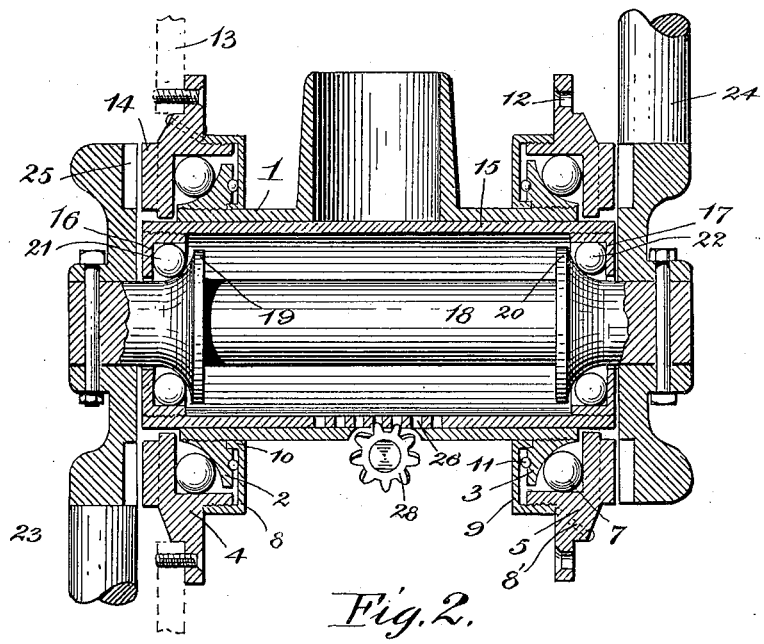

No. 627,897. Patented June 27, 1899.
M. T. BORDEN.
BICYCLE GEAR.
(Application filed Mar. 18, 1897.)
(No Model.) 2 Sheets—Sheet 1.
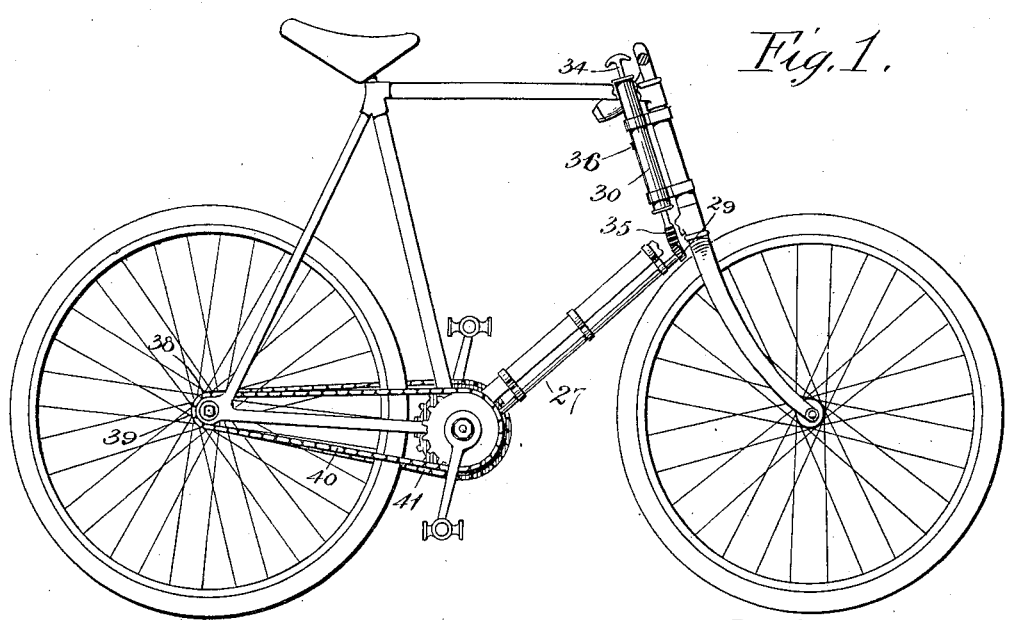
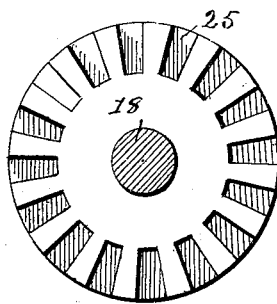
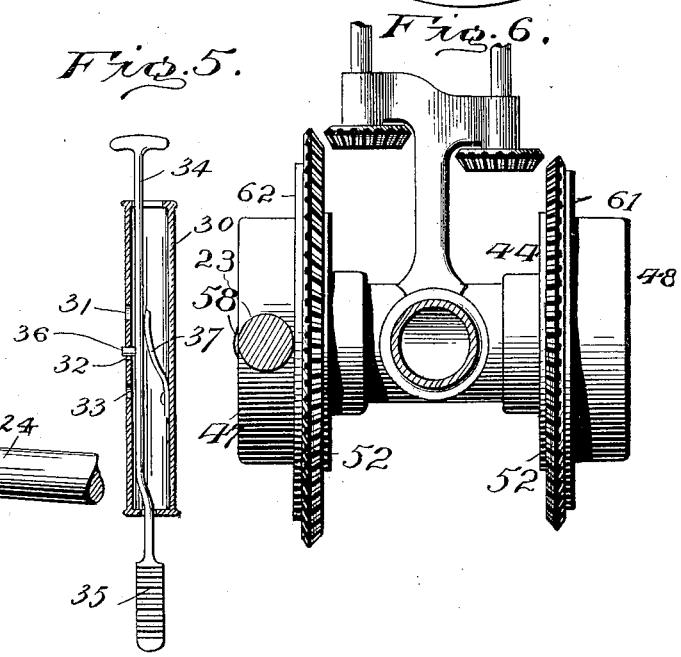
WITNESSES
INVENTOR
Malbert T. Borden.
Attorney No. 627,897. Patented June 27, 1899.
M. T. BORDEN.
BICYCLE GEAR.
(Application filed Mar. 18, 1897.)
(No Model.) 2 Sheets—Sheet 2.

WITNESSES
J. Frank Culverwell
[signature]

INVENTOR
Malbert T. Borden.
By John Shedleberg
Attorney

UNITED STATES PATENT OFFICE.

MALBERT T. BORDEN, OF ROCKMART, GEORGIA.

BICYCLE-GEAR.

SPECIFICATION forming part of Letters Patent No. 627,897, dated June 27, 1899.

Application filed March 18, 1897. Serial No. 628,077. (No model.)

*To all whom it may concern:*

Be it known that I, MALBERT T. BORDEN, a citizen of the United States, residing at Rockmart, in the county of Polk and State of Georgia, have invented certain new and useful Improvements in Bicycle-Gears; and I do hereby declare the following to be a full, clear, and exact description of the invention, such as will enable others skilled in the art to which it appertains to make and use the same.

My invention relates to bicycle-gearing.

My object is to provide a novel form of gearing for bicycles whereby either great power or speed may be obtained whenever desirable.

One of the disadvantages incident to the ordinary form of chain-and-sprocket gearing is that owing to the disposition of the cranks, the crank-shaft, the hanger, and the balls the chain pull is exerted on the bearings and the friction and the strain on the cranks and shaft are quite large.

A further object of the present invention is to obviate the foregoing difficulty by the provision of a novel arrangement of parts.

With the ordinary construction in order to use large balls it is necessary to employ a crank-hanger of abnormal size.

A further object of the present invention is to provide improved form of gearing whereby large balls may be employed without the necessity of using the unsightly large crank-hangers.

A still further object is to provide a bearing which will be practically dust-proof and require little or no lubrication.

Having the foregoing and other minor objects in view, the invention consists of a gearing for bicycles comprising certain improved features and novel combinations of parts appearing more fully hereinafter.

In the accompanying drawings, Figure 1 is a side elevation of a bicycle equipped with my improved gearing; Fig. 2, a sectional view showing the bearing; Fig. 3, a similar view as Fig. 2, but showing a bearing adapted for use in connection with chainless gearing; Fig. 4, a detail view showing the clutch of one of the cranks of the device disclosed in Fig. 2; Fig. 5, a detail of the casing. Fig. 6 is a top plan view of the arrangement of parts shown by Fig. 3 and illustrating the gears, which are adapted to mesh.

Referring now to the device shown in Figs. 2 and 5, the numeral 1 designates the crank-hanger. At opposite ends of this hanger are bearing-cones 2 and 3, which are screwed thereto.

The numerals 4 and 5 designate hubs which are provided with interior ball-races 7 of large size. Screwed to the hubs are dust-caps 8 and 9, which lie back of the cones 2 and 3 and have portions 10 projecting into grooves in said cones. Suitable felt washers could be located in said grooves so as to exclude dust. If desirable, balls 11 might be used, which would be located between the cones 2 and 3 and the dust-caps 8 and 9. Screws 8' are employed to hold the dust-caps in adjusted position. Each hub has peripherally-disposed bolt or screw holes 12, to which can be connected sprocket or bevel gear rims 13 (shown in dotted lines) by bolts or screws. A gear of one size can be connected to one hub and a gear of another size to the other hub, the sizes of these gears to be within the discretion of the rider or manufacturer. The outer surface of each hub is formed into clutch-teeth 14, which extend in a complete circle. There is a sliding hub or cylinder 15, which snugly yet easily fits the crank-hanger and is adapted for movement longitudinally in relation thereto. Screwed into the ends of said sliding cylinder are ball-cups 16 and 17.

The numeral 18 designates a crank-shaft which carries cones 19 and 20, and balls 21 and 22 are employed and located between the cones and the cups.

The numerals 23 and 24 designate the cranks, which may be secured to the crank-shafts in any desired manner, and these are formed into hubs, which have circumferentially-disposed pockets 25, adapted to receive the teeth 14 of the hubs 4 and 5. The sliding hub is provided with a number of openings 26, which form, as it were, a toothed rack. There is a rod or shaft 27, which is journaled to turn in bearings connected to the lower main tube of the bicycle-frame, and this shaft carries on its lower end a pinion 28, which has a portion of its teeth projecting through an opening in the bottom of the crank-hanger and in engagement with the opening 26 of the sliding sleeve. On the forward end of this shaft there is located a pinion 29.

The numeral 30 designates a casing which is connected to the front tube of the frame and provided with three vertically-alined openings 31, 32, and 33.

The numeral 34 designates a rod which is movable vertically in said tube or casing and is formed into a rack 35 on its lower end, which rack is in engagement with the forward gear. This rod has a projection 36, which is adapted for reception in the openings of the tube or casing. The upper end of the rod is formed into a suitable handle, and a ribbon-presser spring 37 is employed for urging the rod laterally to throw the projection into one of the openings and lock said rod. Connected to the hub of the rear wheel, on opposite sides thereof, are two sprocket-wheels 38 and 39. The numerals 40 and 41 designate sprocket-chains which pass over these sprockets and the sprockets connected to the hubs 4 and 5.

Of course, if desirable, shafts could be employed on opposite sides of the bicycle-wheel, which shafts would carry on their forward and rear ends bevel-gears, the rear bevel-gears meshing with the similar gears on the bicycle-wheel and the forward gears being adapted to engage with gear-rims connected to the hubs 4 and 5.

The operation is as follows: When the projection of the operating-rod is in the opening 32, the sliding cylinder or hub will be so disposed that neither hub 4 nor hub 5 will be engaged with the cranks. When thus arranged, the rider can keep his feet on the pedals and coast, as the cranks are at rest. Should speed be desired, the operating-rod is moved to bring the projection into the opening 31, whereupon the sliding hub will be shifted to the left and throw the hub at that end into engagement with the crank. Should the rider desire to have power rather than speed, as when climbing an incline, the operating-rod will be shifted to bring the projection into the opening 33, whereupon the sliding hub will be shifted in an opposite direction and cause the hub 5 to lock or clutch with the crank 24 and the low-speed power-gearing will be thrown into operation.

Referring now to the bearing shown in Fig. 3, in this instance the crank-hanger is employed, as usual, but the shifting hub 15 is made in two parts, which are screwed together, as at 42. Each end of the hub is enlarged, as at 43, and preferably provided with an annular flange 44, which slides on the outside of the crank-hanger. The enlarged ends of the hubs are formed into ball-cups 45, in which are located bearing-rings 46, which may be either concave, convex, or flat, as desirable. Both the cranks 23 and 24 are formed with enlarged hubs 47 and 48, which are provided with ball-cups 49, in which are located bearing-rings 50. Balls 51 are employed. It will be observed that these balls are of very large size, this being possible without the enlargement to any extent of the crank-hangers, an advantage which will be at once obvious to those skilled in the art. Dust-caps 52 are employed as before. Instead of having the crank-shaft formed in one piece and connected to the hubs of the cranks, as in the previous construction, the hub 47 is provided with an integral sleeve 53, which projects into the sliding hub, but is out of contact therewith. This sleeve has a polygonal inner opening extending longitudinally thereof. Said hub 47 is formed with depressions 54. The hub 48 is provided with an axle or shaft 55, which is reduced to provide a shoulder 56, and also has a polygonal portion 57, which is snugly received in the opening in the sleeve 53. Said shaft is provided with a reduced outer screw-threaded portion 58, and on this are located adjusting clamping-nuts 59, which are received in the opening 54, so that there will be no projection to catch in the clothes of the rider. Washers 60 are used and located between the shoulder 56 and the inner end of the sleeve 53, so that after the parts wear the washers can be removed one by one. The hubs 47 and 48 are provided with webs 61 and 62, to which are secured bevel gear-rims of different sizes. This form of gear is not adapted for use in connection with sprocket-wheels, but only for bevel gear-wheels, as both the cranks and hubs move simultaneously when the sliding hub is shifted. The operation in shifting is the same as that before described.

Those skilled in the art to which my invention appertains will readily see that inasmuch as large balls are employed in all forms the friction will be materially lessened in this respect. Furthermore, there is no necessity of employing large and unsightly-looking crank-hangers. No bolt-heads or other projecting parts are used, and hence there is no danger of catching the garments of the rider. The adjustment is also simple and when once obtained will remain constant, and it is only necessary to readjust the parts when they have been worn from use. The bearings are practically dust-proof and the parts need little or no lubrication. Furthermore, with the changeable gearing there is the advantage of employing two different sets of gearing, as when one becomes broken or damaged the efficiency of the machine is not seriously impaired.

Having thus described my invention, what I claim as new, and desire to secure by Letters Patent, is—

1. In a bicycle, the combination with the crank-hanger, of a sleeve movable longitudinally therein and formed with a rack, the crank-shaft rotatable in said sleeve and movable longitudinally thereby, high and low speed gears adapted to be rendered operative by the movement of the shaft, and an operating-shaft carrying a pinion for engaging the rack upon the sleeve, and effecting the movement of the latter, substantially as described.

2. In a bicycle, the combination with the crank-hanger, of a sleeve movable longitudinally therein and formed with a rack, high and low speed gears adapted to be rendered operative by the movement of said sleeve, an operating-shaft having pinions, one of which engages the rack, a plunger mounted upon the frame of the bicycle and carrying a rack engaging the other pinion of the shaft, and means for holding the plunger in the desired position, substantially as described.

3. In a bicycle, the combination with the crank-hanger carrying cones upon the exterior, of a sleeve movable longitudinally therein, the crank-shaft rotatable in the sleeve and movable longitudinally thereby, balls arranged between the crank-shaft and sleeve, hubs rotatable upon the crank-hanger and carrying high and low speed gears, balls arranged between the hubs and cones of the crank-hanger, and coacting clutch members carried by the crank-shaft and hubs, substantially as described.

In testimony whereof I have signed this specification in the presence of two subscribing witnesses.

MALBERT T. BORDEN.

Witnesses:
W. L. CRAIG,
A. H. GRAEFER.